July 25, 1967

M. MORSE 3,332,297

ROLLING LINK BICYCLE CHAIN

Filed Jan. 27, 1966

United States Patent Office 3,332,297
Patented July 25, 1967

3,332,297
ROLLING LINK BICYCLE CHAIN
Milton Morse, 1 Horizon Road,
Fort Lee, N.J. 07024
Filed Jan. 27, 1966, Ser. No. 523,424
3 Claims. (Cl. 74—219)

ABSTRACT OF THE DISCLOSURE

A rolling link bicycle chain in which the clearance existing between the bore in the bushing of each link and the cylindrical outer surface of the mating pin is sufficiently great to allow the pin to rotate on the surface of the bore as the chain exhibits articulation as it passes over and from a sprocket.

---

This invention relates generally to the field of sprocket chains, of the type usually employed in transmitting torque from a bicycle crank to a driven sprocket on the rear axle, and more particularly to an improved form thereof which may operate satisfactorily in the absence of any externally applied lubrication.

In my co-pending application for Letters Patent, Ser. No. 478,212, filed Aug. 9, 1965, entitled, Chain and Sprocket for Derailleur Mechanisms, there is disclosed an offset type chain which is relatively free of binding at each link interconnection thereof, rather than at each alternate link interconnection as is the case with conventional link chains. The present disclosure relates to a still further improved construction and by which not only all of the advantages inherent in the above construction are obtained, but the need for lubrication may be substantially eliminated with consequent advantages.

It is therefore among the principal objects of the present invention to provide an improved form of offset sprocket chains suitable for use in a wide variety of applications in which the elimination of the need for lubrication is desirable.

Another object of the invention lies in the provision of an improved sprocket chain which is incapable of binding when under tension at any link interconnection.

A further object of the invention lies in the provision of an improved sprocket chain possessed of the above advantages, in which the cost of fabrication may be of a reasonably low order, and directly comparable with prior art constructions, thereby permitting consequent wide sale, distribution and use.

A further object of the invention lies in the provision of an improved sprocket chain of the class described which may be installed upon existing sprocket gears and hubs without modification thereof.

A further object of the invention lies in the provision of a bicycle sprocket chain which may be well suited for derailleur mechanisms as well as other more conventional applications.

A feature of the disclosed embodiment lies in the fact that operational noise is substantially no higher than that encountered in using conventional constructions.

These objects and features, as well as other incidental ends and advantages, will more fully appear in the progress of the following disclosure, and be pointed out in the appended claims.

In the drawing, to which reference will be made in the specification, similar reference characters have been employed to designate corresponding parts throughout the several views.

Figure 1:
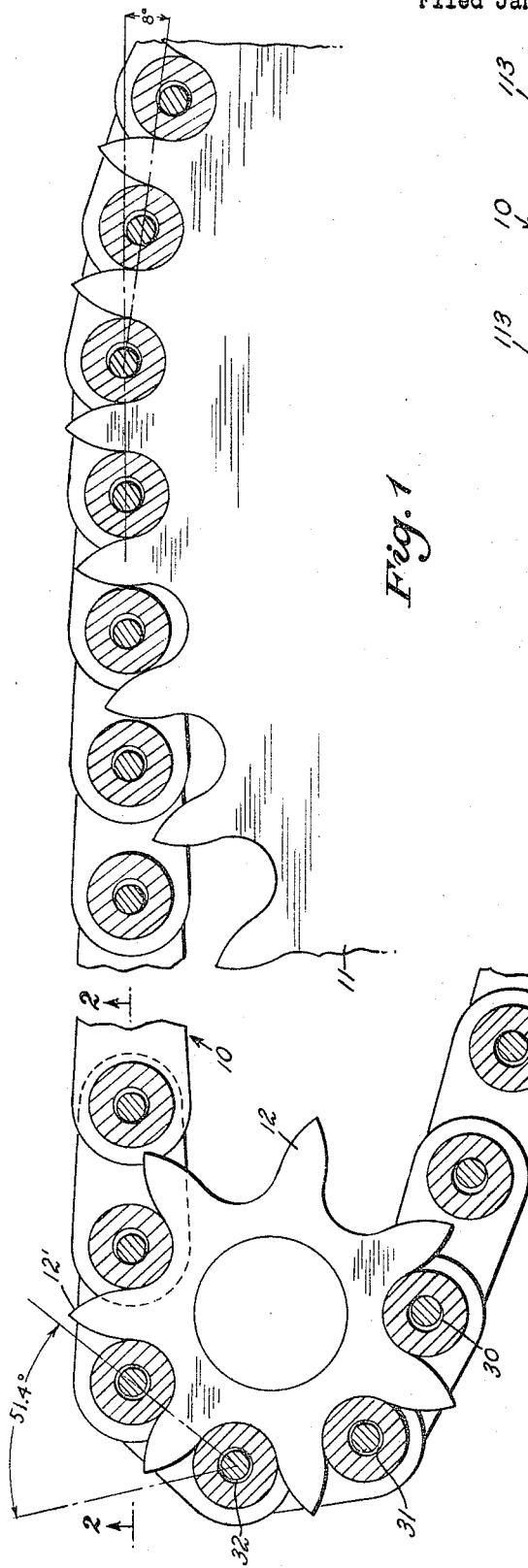
FIGURE 1 is a fragmentary sectional view showing the chain in installed condition upon a driving sprocket and a driven sprocket.

In accordance with the invention, the device, generally indicated by reference character 10, is illustrated in operative association with a driving sprocket 11 and a driven sprocket 12 (see FIGURE 1).

As more fully disclosed in my co-pending application, Ser. No. 478,212 referred to hereinabove, the chain 10 includes a plurality of offset side plates 13, each plate having an outwardly disposed portion 14, an offset portion 15, an inwardly disposed portion 16, as well as openings 17 in the portion 14 and openings 18 in the portions 16.

Extending through the openings 17 and 18 which are placed in overlapped relation are transversely disposed pins 19 having an outer surface 20. Surrounding the pins 19 are rollers 21 which may include integral bushing portions 21a. The rollers 21 are bounded by an inner surface 22 and an outer surface 23, the former contacting the surfaces 20 of the respective pins 19, and the latter contacting the teeth of the sprockets 11 and 12.

In FIGURE 1 there is illustrated a typical installation of the device 10 upon a bicycle (not shown), the driving sprocket having approximately 45 teeth, while the driven sprocket, particularly in the case of a derailleur mechanism, may have as little as 7 teeth in the smallest (highest) ratio gear.

It will be observed that the diameter of the pins 19 is substantially smaller than the diameter of the inner surface 22 of the rollers 21. This difference is substantially exaggerated for purposes of clarity, and in most cases, for example that described above wherein the driving sprocket is approximately 45 teeth, the total clearance, that is to say, twice the difference of the respective radii may be approximately .008″. This clearance will, of course, vary with the size of the chain involved, and, as will more fully appear hereinbelow, it will also vary with the degree of angular change of each link upon engaging the driving sprocket.

Referring to the lefthand portion of FIGURE 1, it will be observed that with a 7-tooth sprocket, the angular change between adjacent links upon engaging and disengaging the sprocket will be aproximately 51.4 degrees. However, it will be observed that the lower portion of the chain prior to engaging the driven sprocket is relatively slack, since torque is transmitted on the upper segment thereof. Once engaged upon the sprocket, tension is transmitted not through the pins 19, but rather through the rollers which are firmly engaged in the interstices between the sprocket teeth. Thus, by the time substantial angular displacement takes place, the problem of friction between the pins and the rollers does not occur, this being diagrammatically illustrated by the placing of the pins in the center of the clearance opening in the bushings, as illustrated at reference characters 30, 31 and 32. By the time disengagement occurs, the link being disengaged is directly in line with the axis of the force transmitted by the driving sprocket 11, so that no relative movement between the rollers and the pins occurs at this point. Further examination of FIGURE 1 discloses displacement of the pins 30 to the left of the center of the bushing with maximum clearance appearing to the right of the pin. This is accounted for by the chain under tension. This condition prevails until the point indicated by reference character 12′ (that is to say, the top dead center tooth) is reached.

Where the chain is fully engaged upon the sprocket 12, the pins indicated at reference characters 31 and 32 are generally centrally disposed because of the lack of tension in the chain.

In the segment below the sprocket 12, the weight of the chain causes a very small degree of tension, thus displacing the pins rightwardly, as seen in FIGURE 1 with respect to the bushing. However, because of the light tension involved, the friction involved is correspondingly light.

Figure 2:
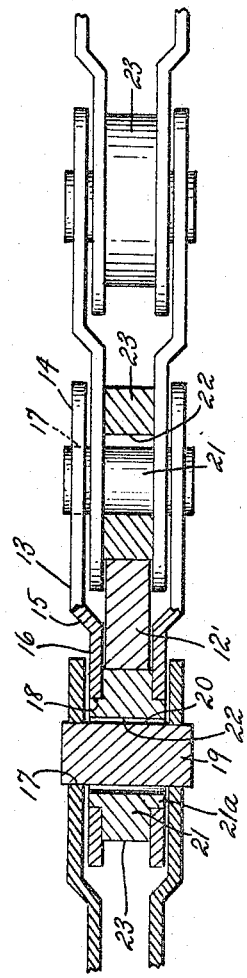
FIGURE 2 is a fragmentary view in elevation, partly in section of a sprocket chain embodying the invention, as seen from the plane 2—2 in FIGURE 1.

Referring to the righthand portion of FIGURE 2, upon engagement with the driving sprocket 11, a deflection between adjacent links will occur during a period in which the surface of the pin is pressed against the inner surface of the roller. However, as indicated in the drawing, owing to the larger diameter of the driving sprocket, this deflection is substantially smaller, and for the driving sprocket and chain combination illustrated amounts to only 8 degrees. Thus, the pin and roller are able to execute a small rolling motion through this degree of arcuate displacement without any relative sliding movement. Further rolling movement would be impossible with the degree of clearance illustrated, but adequate rolling under tension is possible before binding occurs. For this reason, no lubrication need be provided for the chain, as the pure rolling motion involved is relatively frictionless.

Where the difference in the number of teeth between the driving and driven sprockets is less, the clearance between the pins and bushings must be correspondingly greater, but for most combinations, a pure rolling under tension upon engagement with the driven sprocket is usually possible.

Figure 3:
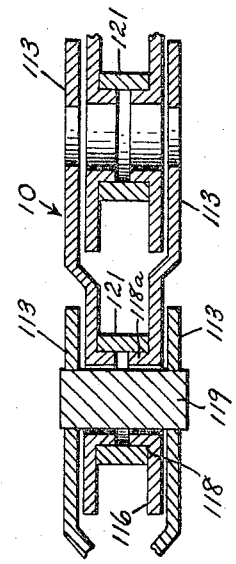
FIGURE 3 is a fragmentary sectional view showing a modified form of the embodiment.

Referring to FIGURE 3 in the drawing, there is illustrated an alternate form of the embodiment, in which, to avoid needless repetition, certain of the component parts thereof have been designated by similar reference characters with the additional prefix "1".

The alternate form of the embodiment differs from the principal form in that each of the side plates 113 is formed in such manner that the openings 118 in the portions 116 are modified to include cylindrically shaped flanges 118a which are formed by drawing the metal removed to form the opening inwardly. The effect of this construction is to grip the inner surfaces of the rollers 121 so as to prevent relative rotation therebetween.

The elimination of the heretofore loose rollers reduces the number of moving parts where abrasive dirt customarily collects, and thereby extends the useful life of the chain.

I wish it to be understood that I do not consider the invention limited to the precise details of structure shown and set forth in this specification, for obvious modifications will occur to those skilled in the art to which the invention pertains.

I claim:

1. In an offset sprocket chain, including a plurality of pivotally interconnected links, each of said links including a pair of offset plates having relatively inwardly and outwardly disposed portions in parallel relation, there being openings in each of said inwardly and outwardly disposed portions, pins extending through and maintained within a plurality of aligned openings in adjoining links, and roller members surrounding said pins, the improvement comprising: said pins having an outer surface, said rollers having an inner surface, there being a sufficient clearance between said last mentioned surfaces to permit a limited degree of rolling motion therebetween.

2. Structure substantially as set forth in claim 1 in combination with a driven sprocket and a driving sprocket, said clearance being sufficient to allow pure rolling motion between said pins and said rollers over the relative angular displacement of a pair of adjoining links upon entering engagement with said driven sprocket.

3. Structure substantially as set forth in claim 1 in which said roller members are each fixed to a single link.

References Cited

UNITED STATES PATENTS

| 1,587,054 | 6/1926 | Weiss | 74—245 |
| 2,182,443 | 12/1939 | McAninch | 74—245 |
| 2,652,143 | 9/1953 | Van Doren | 74—250 |
| 2,988,926 | 6/1961 | Mazzarins | 74—250 |
| 3,135,128 | 6/1964 | Rudolph | 74—255 |

FOREIGN PATENTS 956,413   4/1964   Great Britain.

FRED C. MATTERN, JR., *Primary Examiner.*

J. A. WONG, *Assistant Examiner.*